United States Patent
Sykula et al.

(10) Patent No.: US 10,189,449 B2
(45) Date of Patent: Jan. 29, 2019

(54) VEHICLE CLEANING

(71) Applicant: Ford Global Technologies, LLC, Dearborn, MI (US)

(72) Inventors: Andre Sykula, Sterling Heights, MI (US); Segundo Baldovino, Novi, MI (US); Jose Garcia Crespo, Bloomfield Township, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/631,038

(22) Filed: Jun. 23, 2017

(65) Prior Publication Data

US 2018/0370496 A1    Dec. 27, 2018

(51) Int. Cl.
*B60S 1/48*      (2006.01)
*G01F 23/00*     (2006.01)
*G06K 9/00*      (2006.01)

(52) U.S. Cl.
CPC .......... *B60S 1/485* (2013.01); *G01F 23/0007* (2013.01); *G06K 9/00832* (2013.01)

(58) Field of Classification Search
CPC .......... B60S 1/485; B60S 1/0848; B60S 1/62; B60S 1/481; B08B 3/04; G01F 23/00; B60Q 1/143; B60Q 1/1423
See application file for complete search history.

(56) References Cited

U.S. PATENT DOCUMENTS

| | | | |
|---|---|---|---|
| 4,952,914 A | 8/1990 | Mueller | |
| 5,210,769 A * | 5/1993 | Seidel | G01F 23/00 340/450 |
| 6,236,180 B1 * | 5/2001 | Contos | B60S 1/485 15/250.02 |
| 6,257,500 B1 * | 7/2001 | Petzold | B60S 1/481 239/284.1 |
| 9,108,596 B2 * | 8/2015 | Stratton | B60S 1/62 |
| 9,505,382 B2 * | 11/2016 | Gokan | B60S 1/0848 |
| 2009/0045323 A1 * | 2/2009 | Lu | B60Q 1/1423 250/208.1 |
| 2011/0280026 A1 * | 11/2011 | Higgins-Luthman | B60Q 1/143 362/466 |

(Continued)

FOREIGN PATENT DOCUMENTS

| | | |
|---|---|---|
| CN | 205256282 U | 5/2016 |
| DE | 10110490 A1 | 9/2002 |
| DE | 102004033052 A1 | 2/2006 |

(Continued)

OTHER PUBLICATIONS

GB Search Report dated Nov. 9, 2018 re GB Appl. No. 1810208.7.

*Primary Examiner* — Yuri Kan
(74) *Attorney, Agent, or Firm* — Frank A. MacKenzie; Bejin Bieneman PLC

(57) ABSTRACT

A computer is programmed to, upon determining that obstruction of a window exceeds a first threshold and that a fluid level of a reservoir is above both of two level sensors vertically spaced in the reservoir, pump fluid from the reservoir toward the window; and upon determining that obstruction of an external sensor exceeds a second threshold and that the fluid level is above at least one of the level sensors, pump fluid from the reservoir toward the external sensor.

19 Claims, 7 Drawing Sheets

(56) References Cited

U.S. PATENT DOCUMENTS

2015/0353057 A1\* 12/2015 Witte ........................ B08B 3/04
134/115 R

FOREIGN PATENT DOCUMENTS

| DE | 102006016164 A1 | 10/2007 |
|----|-----------------|---------|
| FR | 2378266 | 8/1978 |
| FR | 2729624 | 7/1996 |
| JP | 2013079002 | 5/2013 |
| WO | 2018189019 A1 | 10/2018 |

\* cited by examiner

VEHICLE CLEANING

BACKGROUND

A vehicle, such as an autonomous or semi-autonomous vehicle, typically includes sensors. Some sensors provide data about operation of the vehicle, for example, wheel speed, wheel orientation, and engine and transmission data (e.g., temperature, fuel consumption, etc.). Some sensors detect the position or orientation of the vehicle. For example, the sensors may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world. For example, the sensors may include radar sensors, scanning laser range finders, light detection and ranging (LIDAR) devices, and image processing sensors such as cameras. The sensors may include communications devices, for example, vehicle-to-infrastructure (V2I) or vehicle-to-vehicle (V2V) devices.

The sensors that are placed externally on the vehicle are exposed to an external environment. The sensors may be obstructed by dirt, dust, debris, precipitation, insects, etc. Obstructions can degrade the performance of the sensors. Cleaning systems using washer fluid or other cleaning solvents can store a finite amount of fluid for cleaning, both for the external sensors and for the windshield, leading to the risk that the washer fluid runs out during a trip by the vehicle.

DETAILED DESCRIPTION

Figure 1:
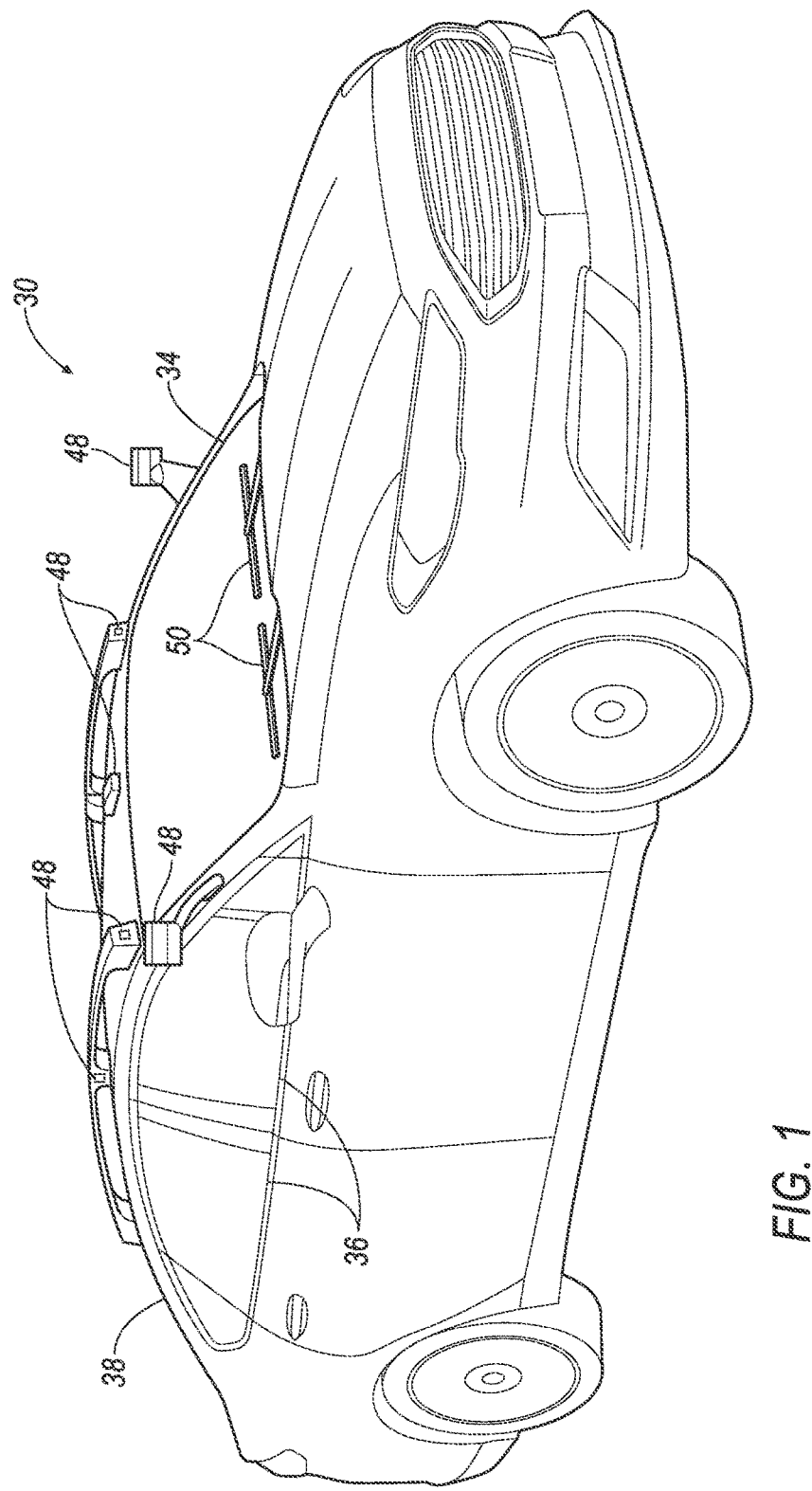
FIG. 1 is a perspective view of an example vehicle.

The cleaning system described herein provides a solution to clean external sensors of a vehicle and to efficiently divide washer fluid between cleaning the sensors and cleaning the windows. The cleaning system includes a reservoir for holding washer fluid and level sensors arranged in the reservoir. The level sensors are positioned to allow a computer to determine when to use the washer fluid for washing the windows and when not to use the washer fluid for washing the windows, preserving washer fluid for keeping the external sensors clean. The cleaning system can use the washer fluid efficiently and thus not necessitate storing as much washer fluid on board the vehicle.

A computer is programmed to, upon determining that obstruction of a window exceeds a first threshold and that a fluid level of a reservoir is above both of two level sensors vertically spaced in the reservoir, pump fluid from the reservoir toward the window; and upon determining that obstruction of an external sensor exceeds a second threshold and that the fluid level is above at least one of the level sensors, pump fluid from the reservoir toward the external sensor.

The computer may be further programmed to, upon determining that obstruction of the window exceeds the first threshold and that the fluid level is below at least one of the level sensors, deactivate a pump supplying the fluid from the reservoir toward the window.

The computer may be further programmed to, upon determining that obstruction of the window exceeds the first threshold and that the fluid level is below at least one of the level sensors, close a valve supplying the fluid from the reservoir toward the window.

The computer may be further programmed to, upon determining that the fluid level is below at least one of the level sensors and that a window wiper is causing smearing on the window, decrease a speed of the window wiper.

The computer may be further programmed to, upon determining that the fluid level is below at least one of the level sensors and that a window wiper is causing smearing on the window, deactivate the window wiper. The computer may be further programmed to determine that the window wiper is causing smearing on the window based on data from a camera directed at the window. The computer may be further programmed to determine that the window wiper is causing smearing on the window based on data from a microphone positioned to detect chatter on the window.

The computer may be further programmed to, upon determining that the fluid level is below at least one of the level sensors and that precipitation is below a third threshold, deactivate the window wiper.

A method includes, upon determining that obstruction of a window exceeds a first threshold and that a fluid level of a reservoir is above both of two level sensors vertically spaced in the reservoir, pumping fluid from the reservoir toward the window; and upon determining that obstruction of an external sensor exceeds a second threshold and that the fluid level is above at least one of the level sensors, pumping fluid from the reservoir toward the external sensor.

The method may include, upon determining that obstruction of the window exceeds the first threshold and that the fluid level is below at least one of the level sensors, deactivating a pump supplying the fluid from the reservoir toward the window.

The method may include, upon determining that obstruction of the window exceeds the first threshold and that the fluid level is below at least one of the level sensors, closing a valve supplying the fluid from the reservoir toward the window.

The method may include, upon determining that the fluid level is below at least one of the level sensors and that a window wiper is causing smearing on the window, decreasing a speed of the window wiper.

The method may include, upon determining that the fluid level is below at least one of the level sensors and that a window wiper is causing smearing on the window, deactivating the window wiper. The method may include determining that the window wiper is causing smearing on the window based on data from a camera directed at the window. The method may include determining that the window wiper is causing smearing on the window based on data from a microphone positioned to detect chatter on the window.

The method may include, upon determining that the fluid level is below at least one of the level sensors and that precipitation is below a third threshold, deactivating the window wiper.

A system includes a reservoir; two level sensors vertically spaced relative to each other in the reservoir; a first pump and a second pump fluidly connected to the reservoir; a first nozzle directed at a window and fluidly connected to the first pump; a second nozzle directed at an external sensor and fluidly connected to the second pump; and a computer in communication with the level sensors and the pumps and programmed to activate the pumps based on data from the sensors.

The computer may be further programmed to, upon determining that obstruction of the window exceeds a first threshold and that a fluid level of the reservoir is above both level sensors, activate the first pump; and upon determining that obstruction of the external sensor exceeds a second threshold and that the fluid level is above at least one of the level sensors, activate the second pump.

The first pump may be horizontally aligned with an uppermost of the level sensors, and the second pump may be disposed no higher than a lowermost of the level sensors.

The system may include a camera directed at the window and in communication with the computer.

With reference to FIG. 1, a vehicle 30 may be an autonomous, semi-autonomous, or nonautonomous vehicle. A computer 32 can be configured to operating the vehicle 30 independently of the intervention of a human driver, completely or to a lesser degree. The computer 32 may be programmed to operate the propulsion, brake system, steering, and/or other vehicle systems. For the purposes of this disclosure, autonomous operation means the computer 32 controls the propulsion, brake system, and steering; semi-autonomous operation means the computer 32 controls one or two of the propulsion, brake system, and steering and a human driver controls the remainder; and nonautonomous operation means the human driver controls the propulsion, brake system, and steering.

The vehicle 30 includes windows 34, 36, 38. The windows 34, 36, 38 include a windshield 34, side windows 36, and a backlite 38. The windshield 34 faces forward, and the backlite 38 faces backward. An occupant of the vehicle 30 can see the external environment through the windows 34, 36, 38. The windows 34, 36, 38 may be formed of any suitably durable transparent material, including glass such as laminated, tempered glass or plastic such as Plexiglas® or polycarbonate.

Figure 2:
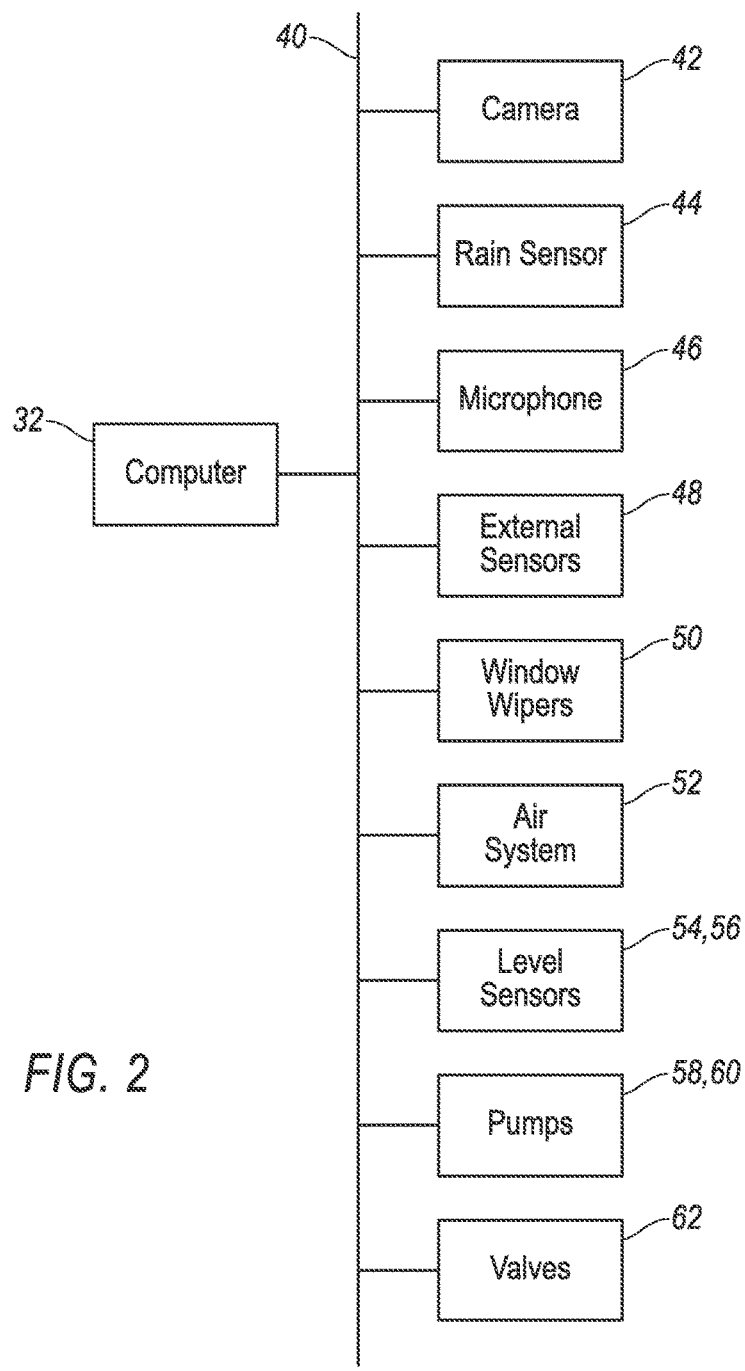
FIG. 2 is a block diagram of an example control system of the vehicle.

With reference to FIG. 2, the computer 32 is a microprocessor-based computer. The computer 32 includes a processor, memory, etc. The memory of the computer 32 includes memory for storing instructions executable by the processor as well as for electronically storing data and/or databases. The computer 32 may be a single computer or may be multiple computers in communication.

The computer 32 may transmit signals through a communications network 40 such as a controller area network (CAN) bus, Ethernet, WiFi, Local Interconnect Network (LIN), onboard diagnostics connector (OBD-II), and/or by any other wired or wireless communications network. The computer 32 may be in communication with a camera 42, a rain sensor 44, a microphone 46, external sensors 48, window wipers 50, an air system 52, level sensors 54, 56, pumps 58, 60, and valves 62.

The camera 42 may be located in the vehicle 30, e.g., in a passenger cabin, and directed at one of the windows 34, 36, 38, e.g., at the windshield 34. The camera 42 is sensitive to visible light and outputs data constituting an image detected by the camera 42. The image may be of the external environment seen through the window 34, 36, 38, and the image may include obstructions of the window 34, 36, 38.

The vehicle 30 may include the rain sensor 44. The rain sensor 44 is any sensor configured to detect precipitation. For example, the rain sensor 44 may be a piezoelectric sensor coupled to the windshield 34 to detect vibrations from, e.g., precipitation. Vibration data such as amplitude and frequency may be associated with, e.g., types of precipitation such as rain or hail. Alternatively, the rain sensor 44 may be positioned where water from rain will pool and configured to detect such water. For example, the rain sensor 44 may include two electrical leads that, when connected, close a circuit; when water is present between the leads, the conductivity of water changes allows current to flow or changes how much current is flowing by a known amount. For another example, the rain sensor 44 may include an LED bulb, a light sensor, and possibly a prism reflecting light from the LED bulb to the light sensor; the presence of water scatters some of the light, reducing the light received by the light sensor by a known amount.

With continued reference to FIG. 2, the vehicle 30 may include the microphone 46. The microphone 46 could be any sensor capable of detecting sound. For example, the microphone 46 may be a transducer that converts sound into an electrical signal. The microphone 46 may be positioned to detect chatter on one or more of the windows 34, 36, 38. "Chatter" in this context means that the window wiper 50 skips or hops when traversing the window 34, 36, 38 instead of substantially continuously maintaining contact with the window 34, 36, 38.

With reference to FIGS. 1 and 2, the vehicle 30 includes the external sensors 48. The external sensors 48 may detect the external world, i.e., the environment outside of the body of the vehicle 30. For example, the external sensors 48 may include radar sensors, scanning laser range finders, light detection and ranging (LIDAR) devices, and image processing sensors such as cameras.

With reference to FIGS. 1 and 2, the vehicle 30 includes the window wipers 50. Each window wiper 50 may be positioned to contact one of the windows 34, 36, 38. The window wipers 50 have blades that are pivoted across the window 34, 36, 38 to remove water or debris. The window wipers 50 may be powered by an electric motor (not shown).

With reference to FIG. 2, the vehicle 30 includes the air system 52. The air system 52 is arranged to direct air at the external sensors 48. The air system 52 can direct a continuous stream or a short burst of air at the external sensors 48. The air system 52 may be equipped to direct air at one of the external sensors 48 at a time or at all or a subset of the external sensors 48 at a time. The air system 52 may include a compressor, accumulators, valves, nozzles, etc. (not shown).

Figure 3:
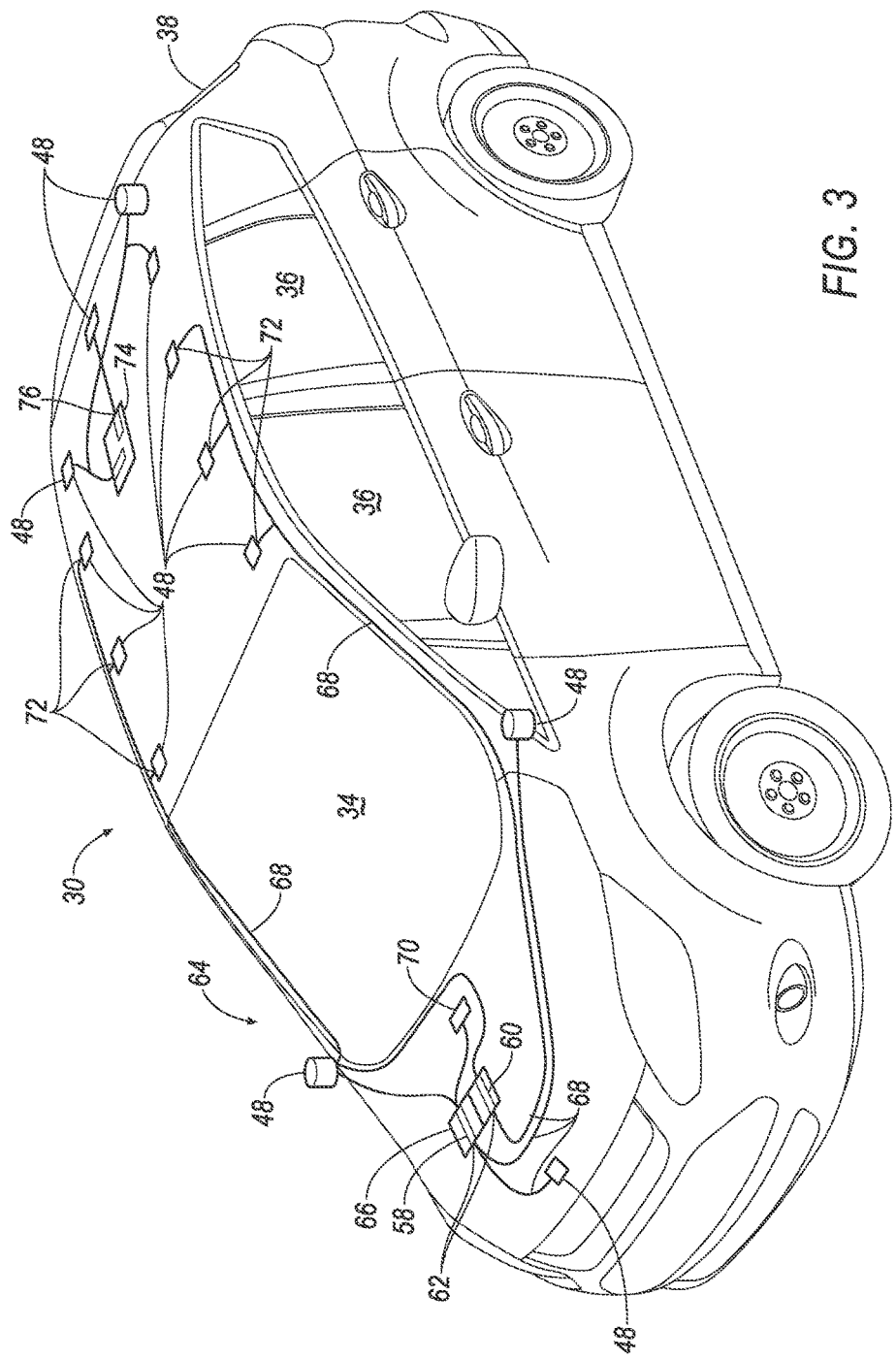
FIG. 3 is a diagram of an example cleaning system of the vehicle.

With reference to FIG. 3, the vehicle 30 includes a liquid system 64. The liquid system 64 includes a reservoir 66, supply lines 68, the pumps 58, 60, the valves 62, and nozzles 70, 72. The liquid system 64 distributes washer fluid stored in the reservoir 66 to the nozzles 70, 72. "Washer fluid" refers to any liquid stored in the reservoir 66 for cleaning. The washer fluid may include solvents, detergents, diluents such as water, etc.

Figure 4:
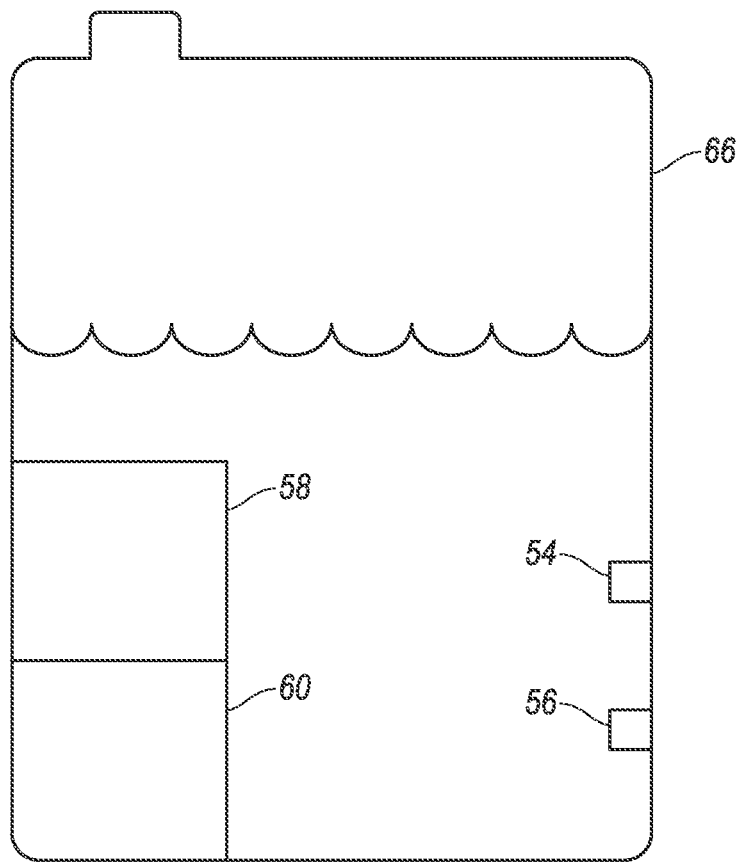
FIG. 4 is a diagram of a reservoir of the cleaning system.

With reference to FIGS. 3 and 4, the reservoir 66 may be a tank fillable with liquid, e.g., washer fluid for window cleaning. The reservoir 66 may have a single chamber. The reservoir 66 may be disposed in a front of the vehicle 30, specifically, in an engine compartment forward of a passenger cabin. The vehicle 30 may include a subsidiary reservoir 74 positioned in a rear of the vehicle 30.

The level sensors 54, 56 are vertically spaced relative to each other, e.g., stacked with a space vertically separating them from one another, in the reservoir 66. The level sensors 54, 56 may be fixed to a wall of the reservoir 66. The level sensors 54, 56 may include an upper level sensor 54 and a lower level sensor 56. The upper level sensor 54 is the uppermost of the level sensors 54, 56 and disposed above the lower level sensor 56, and the lower level sensor 56 is the lowermost of the level sensors 54, 56 and disposed below the upper level sensor 54. The level sensors 54, 56 may be point-level sensors, that is, capable of detecting whether the washer fluid is above or below the horizontal level at which the level sensors 54, 56 are disposed. The level sensors 54, 56 may be any sensors capable of detecting whether the washer fluid is above or below the sensors, e.g., magnetic, mechanical float, conductive, ultrasonic, capacitance, optical interface, microwave sensors, etc.

With continued reference to FIGS. 3 and 4, the pumps 58, 60 may force the washer fluid through the supply lines 68 to the nozzles 70, 72 with sufficient pressure that the washer fluid sprays from the nozzles 70, 72. The pumps 58, 60 include a first pump 58 and a second pump 60 fluidly connected to the reservoir 66. (The adjectives "first" and "second" are used throughout this document as identifiers and are not intended to signify importance or order.) The first pump 58 and the second pump 60 may be attached or disposed in the reservoir 66. The first pump 58 may be horizontally aligned with the upper level sensor 54, and the second pump 60 may be disposed no higher than the lower level sensor 56. Alternatively, both pumps 58, 60 may be disposed no higher than the lower level sensor 56. The subsidiary reservoir 74 may include a subsidiary pump 76.

With reference to FIG. 3, the supply lines 68 may be, e.g., flexible tubes. The supply lines 68 lead from the pumps 58, 60 to the valves 62 and from the valves 62 to the nozzles 70, 72.

The valves 62 control the flow of the washer fluid. The valves 62 may prevent the washer fluid from flowing through one of the supply lines 68 or may direct the washer fluid through one or another supply line 68. The valves 62 may be components for controlling the flow of the washer fluid, e.g., hydraulic, pneumatic, solenoid-activated, motor-activated, etc.

The nozzles 70, 72 include one or more first nozzles 70 and one or more second nozzles 72. The first nozzles 70 are each directed at one of the windows 34, 36, 38 and fluidly connected to the first pump 58. The second nozzles 72 are each directed at one of the external sensors 48 and fluidly connected to the second pump 60. The nozzles 70, 72 direct the flow of the washer fluid at the windows 34, 36, 38 or at the external sensors 48, and the nozzles 70, 72 may increase the speed of the flow.

Figure 5:
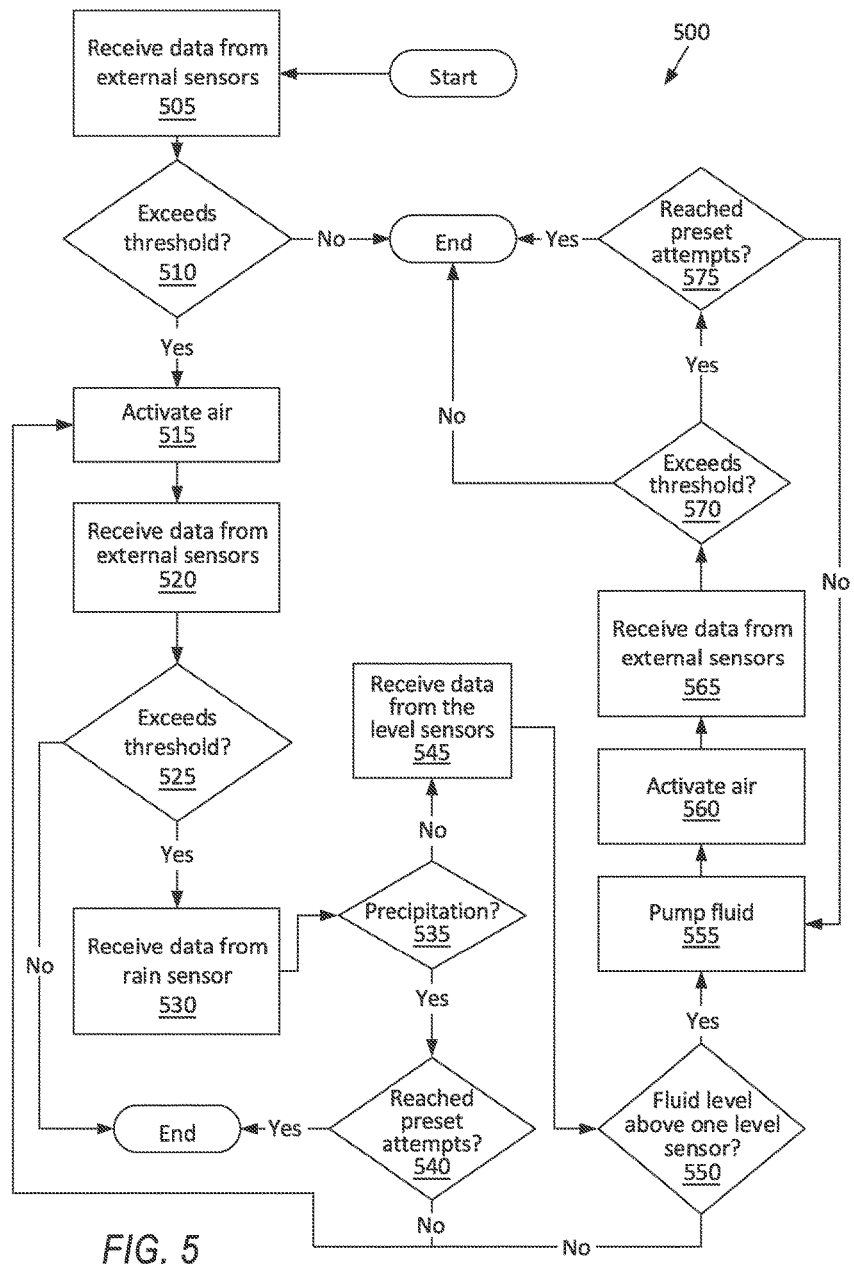
FIG. 5 is a process flow diagram of an example process for cleaning an external sensor of the vehicle.

FIG. 5 is a process flow diagram illustrating an exemplary process 500 for cleaning one of the external sensors 48 of the vehicle 30. The memory of the computer 32 may store programming for performing the steps of the process 500.

The process 500 begins in a block 505, in which the computer 32 receives data from the external sensors. The data includes data for determining an obstruction level for each of the external sensors 48. The obstruction level is a quantitative measure of how much of a field of view of the external sensor 48 is obstructed, that is, is blocked by dust, dirt, precipitation, insects, debris, etc. Obstructed portions of the field of view may be identified by, for example, comparing sequential images of the external sensor 48; the portions of the field of view that do not change between the sequential images while the vehicle 30 is in motion are likely obstructed, and the portions of the field of view that change are likely unobstructed. For another example, if the external sensor 48 is a radar or LIDAR, the obstructed portions of the field of view may be identified as the portions for which a detected distance is at or below a distance threshold. The distance threshold may be set as a distance from a receptor of the external sensor 48 to a lens or cover of the external sensor 48 (or the distance threshold may be set slightly higher to take into account measurement uncertainty of the external sensor 48). The obstruction level may be a proportion of the field of view of the external sensor 48 that is obstructed. The proportion of the field of view may be, e.g., a ratio of a total solid angle of the field of view that is obstructed to a solid angle of the entire field of view, or a ratio of a total obstructed area of an image (expressed in, e.g., pixels) detected by the external sensor 48 to the entire area of the image.

Next, in a decision block 510, the computer 32 determines the obstruction level for each external sensor 48 and determines whether any of the obstruction levels exceeds an external-sensor obstruction threshold. The external-sensor obstruction threshold may be preset and stored in the memory of the computer 32. The external-sensor obstruction threshold may be set by, e.g., experimentation or simulation to ensure reliable operation for the external sensor 48. For example, the external sensor 48 may be obstructed to a range of obstruction levels, the vehicle 30 may drive a course with the external sensor 48 at each of the obstructions levels of the range, and driving performances at the obstruction levels of the range are compared, or performances detecting objects and obstacles along the course are compared. If none of the obstruction levels of the external sensors 48 exceed the external-sensor obstruction threshold, the process 500 ends.

If one of the obstruction levels of the external sensors 48 exceeds the external-sensor obstruction threshold, next, in a block 515, the computer 32 activates the air system 52 to emit a jet of air at the external sensor 48 with the excessive obstruction level.

Next, in a block 520, the computer 32 receives data from the external sensors 48, as described above with respect to the block 505.

Next, in a decision block 525, the computer 32 determines the obstruction level for each external sensor 48 and determines whether any of the obstruction levels exceeds the external-sensor obstruction threshold, as described above with respect to the decision block 510. If none of the obstruction levels of the external sensors 48 exceed the external-sensor obstruction threshold, the process 500 ends.

If one of the obstruction levels of the external sensors 48 still exceeds the external-sensor obstruction threshold, next, in a block 530, the computer 32 receives data from the rain sensor 44.

Next, in a decision block 535, the computer 32 determines whether precipitation is above a precipitation threshold based on the data from the rain sensor 44. The precipitation threshold may be chosen based on experimentation to correspond to whether precipitation is occurring. For example, if the rain sensor 44 is a piezoelectric sensor, amplitude, frequency, or other vibration data may be recorded under various rainy and dry driving conditions, and the precipitation threshold may be chosen as a cutoff of the amplitude, frequency, or other vibration measures between the rainy conditions and the dry conditions. Alternatively, the precipitation threshold may be chosen to correspond to whether sufficient precipitation is occurring to cause an excessive obstruction level of one of external sensors 48. For example, if the rain sensor 44 is a piezoelectric sensor, amplitude, frequency, or other vibration data may be recorded under various rainy and dry driving conditions while also receiving data from the external sensor 48, and the precipitation threshold may be chosen as a cutoff of the amplitude, frequency, or other vibration measures between the obstruction level of the external sensor 48 being above and below the external-sensor obstruction threshold. If the precipitation is below the precipitation threshold, the process 500 proceeds to a block 545.

If the precipitation is above the precipitation threshold, next, in a decision block 540, the computer 32 determines whether the computer 32 has reached a preset number of attempts to use the air system 52. The preset number of attempts may be determined by experimentation to determine how many attempts of emitting air jets are needed to remove different types of obstructions. The preset number of attempts may be, e.g., five. The computer 32 compares the number of times that the computer 32 has executed the block 515 to the preset number of attempts. If the computer 32 has reached the preset number of attempts, the process 500 ends. If the computer 32 has not yet reached the preset number of attempts, the process 500 returns to the block 515 to perform another attempt.

After the decision block 535, if the precipitation is below the precipitation threshold, the computer 32 receives data from the level sensors 54, 56. Each of the level sensors 54, 56 provides data about whether the level of the washer fluid in the reservoir 66 is above or below that level sensor 54, 56.

Next, in a decision block 550, the computer 32 determines whether the fluid level is above at least one of the level sensors 54, 56, that is, whether the fluid level is above the level of the lower level sensor 56. If the fluid level is below the lower level sensor 56, that is, is below both level sensors 54, 56, the process 500 returns to the block 515.

If the fluid level is above at least one of the level sensors 54, 56, next, in a block 555, the computer 32 pumps fluid from the reservoir 66 toward the external sensor 48 that is excessively obstructed. The computer 32 may activate the second pump 60 and the valves 62 to direct the washer fluid along a path from the reservoir 66 to the external sensor 48 that is excessively obstructed.

Next, in a block 560, the computer 32 activates the air system 52 to emit a jet of air at the external sensor 48 with the excessive obstruction.

Next, in a block 565, the computer 32 receives data from the external sensors 48, as described above with respect to the block 505.

Next, in a decision block 570, the computer 32 determines the obstruction for each external sensor 48 and determines whether any of the obstructions exceeds the external-sensor obstruction threshold, as described above with respect to the decision block 510. If none of the obstructions of the external sensors 48 exceed the external-sensor obstruction threshold, the process 500 ends.

If one of the obstruction levels of the external sensors 48 still exceeds the external-sensor obstruction threshold, next, in a decision block 575, the computer 32 determines whether the computer 32 has reached a preset number of attempts to use the liquid system 64. The preset number of attempts may be determined by experimentation to determine how many attempts of pumping the washer fluid are needed to remove different types of obstructions. The preset number of attempts may be, e.g., five. The computer 32 compares the number of times that the computer 32 has executed the block 555 to the preset number of attempts. If the computer 32 has reached the preset number of attempts, the process 500 ends.

If the computer 32 has not yet reached the preset number of attempts, the process 500 returns to the block 555 to perform another attempt.

Figure 6:
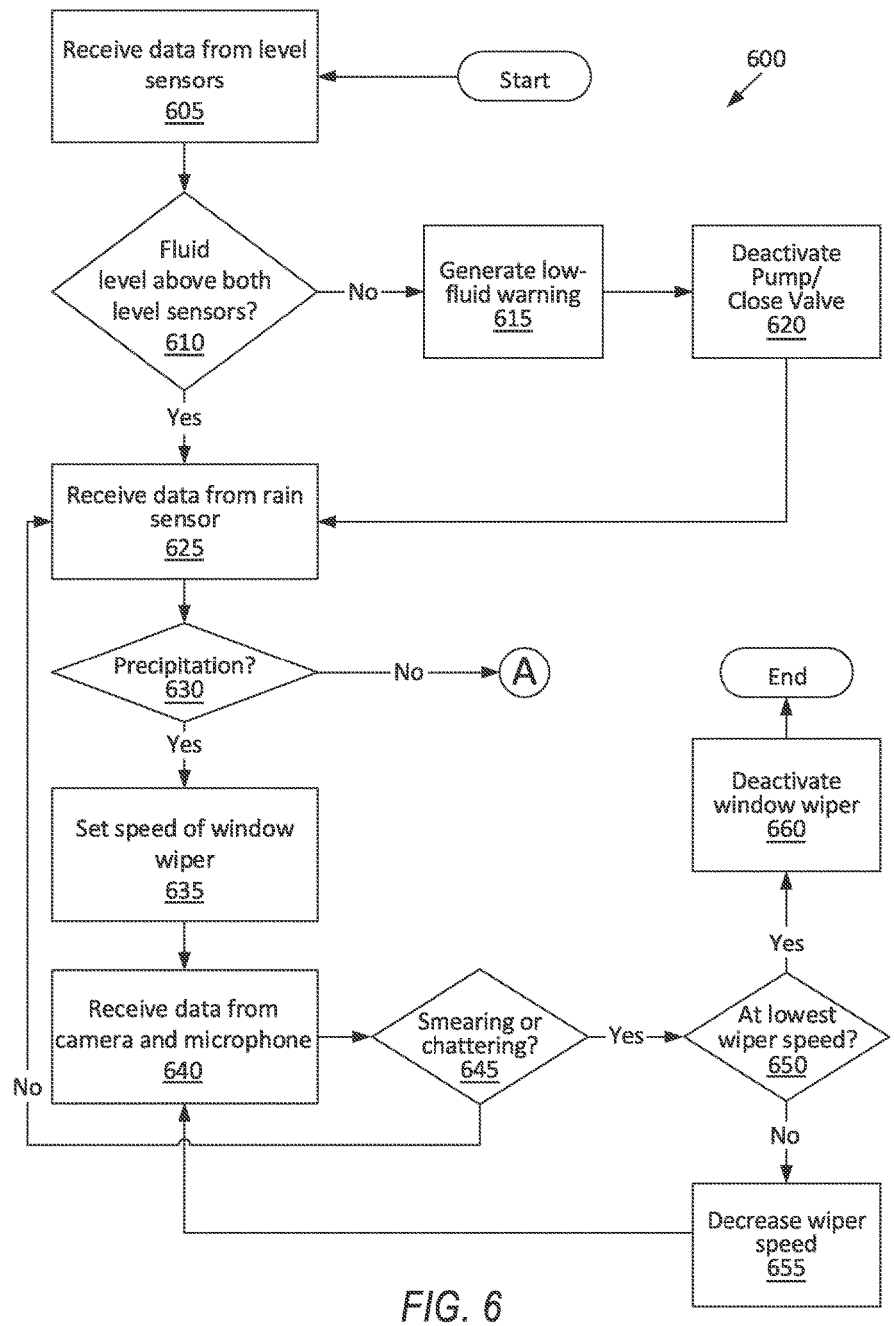
FIG. 6 is a portion of a process flow diagram of an example process for cleaning a window of the vehicle.
Figure 7:
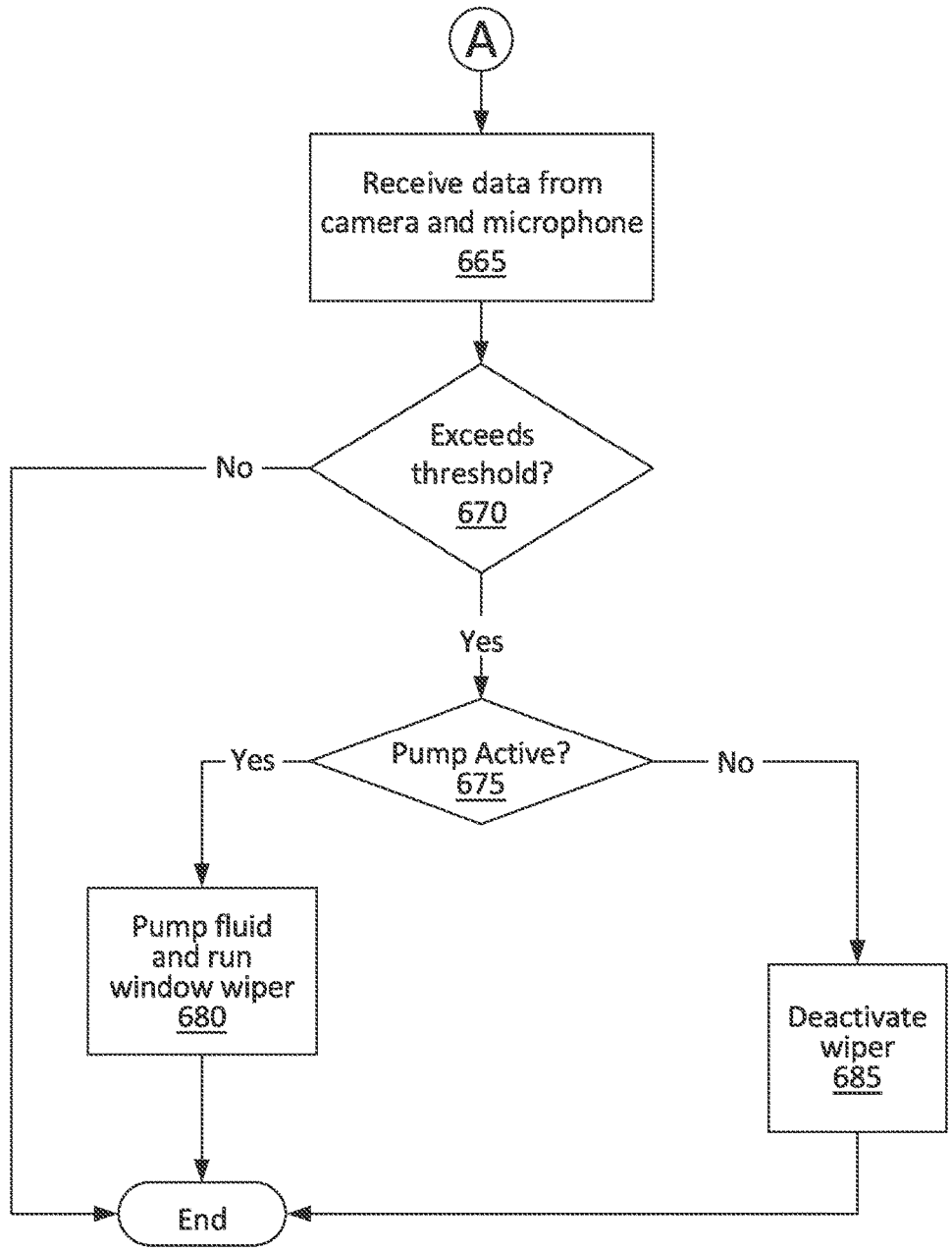
FIG. 7 is a remainder of the process flow diagram of FIG. 6.

FIGS. 6 and 7 are a process flow diagram illustrating an exemplary process 600 for cleaning one of the windows 34, 36, 38 of the vehicle 30. The memory of the computer 32 may store programming for performing the steps of the process 600.

The process 600 begins in a block 605, in which the computer 32 receives data from the level sensors 54, 56. Each of the level sensors 54, 56 provides data about whether the level of the washer fluid in the reservoir 66 is above or below that level sensor 54, 56.

Next, in a decision block 610, the computer 32 determines whether the fluid level of the reservoir 66 is above both level sensors 54, 56, that is, whether the fluid level is above the upper level sensor 54. If the fluid level is above both level sensors 54, 56, the process 600 proceeds to a block 625.

If the fluid level of the reservoir 66 is below at least one of the level sensors 54, 56, that is, if the fluid level is below the upper level sensor 54, next, in a block 615, the computer 32 generates a low-fluid warning. The low-fluid warning may be displayed or otherwise transmitted to occupants of the vehicle 30 and/or to a remote server in communication with the vehicle 30.

Next, in a block 620, the computer 32 prevents the liquid system 64 from directing washer fluid at the windows 34, 36, 38. For example, the computer 32 may deactivate the first pump 58, which supplies the washer fluid from the reservoir 66 toward the windows 34, 36, 38. For another example, the computer 32 may close one of the valves 62 supplying the washer fluid from the reservoir 66 toward the windows 34, 36, 38, that is, one of the valves 62 between the first pump 58 and the first nozzles 70. For another example, if the first pump 58 is horizontally aligned with the upper level sensor 54, the computer 32 may do nothing because the washer fluid is already below the level of the first pump 58.

Next, in a block 625, the computer 32 receives data from the rain sensor 44.

Next, in a decision block 630, the computer 32 determines whether precipitation is above a precipitation threshold based on the data from the rain sensor 44. The precipitation threshold may be chosen based on experimentation to correspond to whether precipitation is occurring or to whether sufficient precipitation is occurring to cause an excessive obstruction of one of windows 34, 36, 38. If the precipitation is below the precipitation threshold, the process 600 proceeds to a block 665.

If the precipitation is above the precipitation threshold, next, in a block 635, the computer 32 sets a speed of the window wipers 50 based on a level of precipitation, that is, based on the data from the rain sensor 44. Speeds of the window wiper 50 may be stored in a table of corresponding precipitation levels. The speeds of the window wiper 50 may be preset based on, e.g., experimentation to find speeds sufficient to clear precipitation from the window 34, 36, 38 with substantially no chattering.

Next, in a block 640, the computer 32 receives data from the camera 42 and/or the microphone 46, specifically, the camera 42 and/or the microphone 46 directed at the window 34, 36, 38 for which the window wiper 50 is operating.

Next, in a decision block 645, the computer 32 determines whether the window wiper 50 is causing smearing on the window 34, 36, 38 based on the data from the camera 42 and/or the data from the microphone 46. The data from the camera 42 may indicate, e.g., that obstructions are present on the window 34, 36, 38 immediately after the window wiper 50 wipes, i.e., that the camera 42 cannot detect the external environment through some areas of the window 34, 36, 38. For example, the portions of the field of view that do not change between the sequential images while the vehicle 30 is in motion are likely obstructed, and the portions of the field of view that change are likely unobstructed. The computer 32 may compare the pattern of obstructions in the images to patterns of obstructions stored as baseline images, and if the patterns in the images are a close match to a pattern in one of the baseline images, then the window wiper 50 is causing smearing. Alternatively or additionally, the microphone 46 may indicate, e.g., that the window wiper 50 is chattering while wiping. The computer 32 may compare the sound detected by the microphone 46 to baseline recordings stored in the memory of the computer 32 corresponding to chatter, and if the sound is a close match to one of the baseline recordings, then chatter is occurring and the window wiper 50 is causing smearing. If no smearing is occurring, the process 600 returns to the block 625.

If smearing is occurring, next, in a decision block 650, the computer 32 determines whether the window wiper 50 is operating at a lowest speed setting. If the window wiper 50 is operating at the lowest speed setting, the process 600 proceeds to the block 660.

If the window wiper 50 is not operating at the lowest speed setting, next, in a block 655, the computer 32 decreases the speed of the window wiper 50. After the block 655, the process 600 returns to the block 640.

If the window wiper 50 is operating at the lowest speed, after the decision block 650, in the block 660, the computer 32 deactivates the window wiper 50. After the block 660, the process 600 ends.

If the precipitation is below the precipitation threshold, after the decision block 630, in the block 665, the computer 32 receives data from the camera 42 and/or the microphone 46, as described above with respect to the block 640.

Next, in a decision block 670, the computer 32 determines whether an obstruction level of the window 34, 36, 38 exceeds a window obstruction threshold. The obstruction level is a quantitative measure of how much of the window 34, 36, 38 is obstructed, that is, is blocked by dust, dirt, precipitation, insects, debris, etc. For example, the obstruction level may be a proportion of the window 34, 36, 38 through which an occupant cannot see. The window obstruction threshold may be preset and stored in the memory of the computer 32. The window obstruction threshold may be set by, e.g., experimentation and/or surveying to ensure a comfortable view through the window 34, 36, 38 for the occupant of the vehicle 30. If the obstruction level of the window 34, 36, 38 is below the window obstruction threshold, the process 600 ends.

If the obstruction level of the window 34, 36, 38 is above the window obstruction threshold, next, in a decision block 675, the computer 32 determines whether the first pump 58 is able to pump washer fluid to the window 34, 36, 38, i.e., whether the computer 32 has performed the block 620, i.e., whether the first pump 58 has been deactivated, whether the valve 62 from the first pump 58 has been closed, or whether the first pump 58 is horizontally aligned with the upper level sensor 54. If the first pump 58 is not able to pump the washer fluid, the process 600 proceeds to a block 685.

If the first pump 58 is able to pump the washer fluid, next, in a block 680, the first pump 58 pumps the washer fluid to the window 34, 36, 38 and the window wiper 50 runs. After the block 680, the process 600 ends.

If the first pump 58 is not able to pump the washer fluid, after the decision block 675, in the block 685, the computer 32 deactivates the window wiper 50. After the block 685, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

What is claimed is:

1. A computer comprising a processor and a memory storing processor-executable instruction, the processor programmed to:
   upon determining that obstruction of a window exceeds a first threshold and a reservoir fluid level is above both of two level sensors vertically spaced in the reservoir, wash the window using fluid from the reservoir; and
   upon determining that obstruction of an external sensor exceeds a second threshold and the fluid level is above at least one of the level sensors, wash the external sensor using fluid from the reservoir.

2. The computer of claim 1, wherein the computer is further programmed to, upon determining that obstruction of the window exceeds the first threshold and that the fluid level is below at least one of the level sensors, deactivate a pump supplying the fluid from the reservoir for washing the window.

3. The computer of claim 1, wherein the computer is further programmed to, upon determining that obstruction of the window exceeds the first threshold and that the fluid level is below at least one of the level sensors, close a valve supplying the fluid from the reservoir for washing the window.

4. The computer of claim 1, wherein the computer is further programmed to, upon determining that the fluid level is below at least one of the level sensors and that a window wiper is causing smearing on the window, decrease a speed of the window wiper.

5. The computer of claim 1, wherein the computer is further programmed to, upon determining that the fluid level is below at least one of the level sensors and that a window wiper is causing smearing on the window, deactivate the window wiper.

6. The computer of claim 5, wherein the computer is further programmed to determine that the window wiper is causing smearing on the window based on data from a camera directed at the window.

7. The computer of claim 5, wherein the computer is further programmed to determine that the window wiper is causing smearing on the window based on data from a microphone positioned to detect chatter on the window.

8. The computer of claim 1, wherein the computer is further programmed to, upon determining that the fluid level is below at least one of the level sensors and that precipitation is below a third threshold, deactivate the window wiper.

9. A method comprising:
   upon determining that obstruction of a window exceeds a first threshold and a reservoir fluid level is above both of two level sensors vertically spaced in the reservoir, washing the window using fluid from the reservoir; and
   upon determining that obstruction of an external sensor exceeds a second threshold and the fluid level is above at least one of the level sensors, washing the external sensor using fluid from the reservoir.

10. The method of claim 9, further comprising, upon determining that obstruction of the window exceeds the first threshold and that the fluid level is below at least one of the level sensors, deactivating a pump supplying the fluid from the reservoir for washing the window.

11. The method of claim 9, further comprising, upon determining that obstruction of the window exceeds the first threshold and that the fluid level is below at least one of the level sensors, closing a valve supplying the fluid from the reservoir for washing the window.

12. The method of claim 9, further comprising, upon determining that the fluid level is below at least one of the level sensors and that a window wiper is causing smearing on the window, decreasing a speed of the window wiper.

13. The method of claim 9, further comprising, upon determining that the fluid level is below at least one of the level sensors and that a window wiper is causing smearing on the window, deactivating the window wiper.

14. The method of claim 13, further comprising determining that the window wiper is causing smearing on the window based on data from a camera directed at the window.

15. The method of claim 13, further comprising determining that the window wiper is causing smearing on the window based on data from a microphone positioned to detect chatter on the window.

16. The method of claim 9, further comprising, upon determining that the fluid level is below at least one of the level sensors and that precipitation is below a third threshold, deactivating the window wiper.

17. A system comprising:
a reservoir;
two level sensors vertically spaced relative to each other in the reservoir;
a first pump and a second pump fluidly connected to the reservoir;
a first nozzle directed at a window and fluidly connected to the first pump;
a second nozzle directed at an external sensor and fluidly connected to the second pump; and
a computer in communication with the level sensors and the pumps and programmed to:
upon determining that obstruction of the window exceeds a first threshold and that a fluid level of the reservoir is above both level sensors, activate the first pump to wash the window; and
upon determining that obstruction of the external sensor exceeds a second threshold and that the fluid level is above at least one of the level sensors, activate the second pump to wash the external sensor.

18. The system of claim 17, wherein the first pump is horizontally aligned with an uppermost of the level sensors, and the second pump is disposed no higher than a lowermost of the level sensors.

19. The system of claim 17, further comprising a camera directed at the window and in communication with the computer.

* * * * *